(12) United States Patent
Lee

(10) Patent No.: US 7,810,561 B2
(45) Date of Patent: *Oct. 12, 2010

(54) METHOD AND PRODUCT TO CONSOLIDATE A FORMATION

(75) Inventor: Jesse Lee, Paris (FR)

(73) Assignee: Schlumberger Technology Corporation, Sugarland, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/958,830

(22) Filed: Dec. 18, 2007

(65) Prior Publication Data

US 2008/0149328 A1 Jun. 26, 2008

(30) Foreign Application Priority Data

Dec. 21, 2006 (EP) ................... 06292017

(51) Int. Cl.
*E21B 33/138* (2006.01)

(52) U.S. Cl. ................... 166/248; 166/60; 166/66.5; 166/288; 166/302

(58) Field of Classification Search ................. None
See application file for complete search history.

(56) References Cited

U.S. PATENT DOCUMENTS

2005/0274510 A1* 12/2005 Nguyen et al. ......... 166/250.12
2006/0131012 A1* 6/2006 Blauch et al. ............... 166/249

FOREIGN PATENT DOCUMENTS

WO   WO 03 063548 A2   7/2003

* cited by examiner

*Primary Examiner*—Zakiya W. Bates
(74) *Attorney, Agent, or Firm*—David Cate; Robin Nava; Jeff Griffin

(57) ABSTRACT

A product is described, the product is in liquid state and comprises: a first electrically non-conductive susceptor; a second electrically conductive susceptor; monomer molecules; and an initiator, suitable to trigger polymerization chain reaction of the monomer molecules, when activated by the first and/or the second susceptor. Further, a method is described to treat a wellbore including a zone, the method comprising the steps of: pumping the product above into the wellbore; placing the product in the vicinity of the zone; and applying an alternating magnetic field on the product.

19 Claims, 1 Drawing Sheet

METHOD AND PRODUCT TO CONSOLIDATE A FORMATION

RELATED APPLICATION DATA

This application claims the benefit of EP Patent Application 06292017.8 filed Dec. 21, 2006 entitled, "NOVEL ACTIVATION MECHANISM FOR OILFIELD CHEMICAL PRODUCTS"

FIELD OF THE INVENTION

The present invention broadly relates to well cementing. More particularly the invention relates to a composition useful to encapsulate other composition and to release it easily. The composition of the invention applies especially for wells from a subterranean reservoir, such as for instance an oil and gas reservoir or a water reservoir.

DESCRIPTION OF THE PRIOR ART

The cementing of casings in boreholes for stabilization and zonal isolation is well known, especially in the field of well construction in the oil and gas industry. Such operations are performed at various stages while the well is being drilled. In a casing operation, the drill string used to drill the borehole is withdrawn and a tubular casing run into the borehole such that a space is left between the outer surface of the casing and the wall of the borehole (an annulus). Cement slurry is then pumped down the inside of the casing such that it exits the casing at the bottom and flow back towards the surface in the annulus. When the cement sets, the casing is fixed in the borehole and the various layers through which the borehole passes are supported and isolated by the cement and casing. Drilling is then resumed, but at a smaller diameter than previously because of the presence of the casing.

Setting casing can be useful to support a weak formation or to seal off zones of high or low pressure to prevent uncontrolled influx of fluids or damage to the formation due to the use of dense drilling fluids to balance high formation pressures. However, sometimes unconsolidated or weak formations are such during the drilling, that the setting of the casing is affected. Therefore it is necessary first to perform a quick operation that will consolidate the formation. Also, other problems can occur when the casing is already set and the integrity of the metal casing is affected in such a way that it is also necessary to perform an operation, preferably quickly, that will consolidate the casing.

There is a need therefore of a method and product that can create quickly a solid state in the wellbore.

SUMMARY OF THE INVENTION

According to one aspect of the invention, the invention provides a product being in liquid state and comprising: a first electrically non-conductive susceptor; a second electrically conductive susceptor; monomer molecules; and an initiator, suitable to trigger polymerization chain reaction of said monomer molecules, when activated by said first and/or said second susceptor. The fact that the product is liquid and/or has a sufficient rheology so it is pumpable is essential for oilfield application.

Preferably, the initiator includes any organic compound with a labile group taken in the list constituted of azo (—N=N—), disulphide (—S—S—), and peroxide (—O—O—). More preferably, the initiator includes a persulfate, the monomer is acrylate-based monomer, the first electrically non-conductive susceptors comprise iron oxide particles, hexagonal ferrite particles, or magnetically soft ferrite particles and the second electrically conductive susceptors comprise elemental ferromagnetic particles or ferromagnetic alloys. Preferably, the second electrically conductive susceptors comprise nickel, iron, and cobalt and combinations thereof and of their alloys.

Preferably, the product further comprises a material suitable to set, as for example cement, geopolymer and resin.

According to another aspect of the invention, the invention provides a method to treat a wellbore including a zone comprising the steps of: pumping a product as disclosed previously into said wellbore; placing said product in the vicinity of said zone; and applying an alternating magnetic field on said product.

In a first embodiment the method applies to consolidate the wellbore, wherein said zone is an unconsolidated zone. In a second embodiment the method applies to eliminate losing fluid in the wellbore, wherein said zone is a loss zone.

In a third embodiment the step of applying an alternating magnetic field on said product is made just before said product is placed in the vicinity of said zone. In a fourth embodiment the step of applying an alternating magnetic field on said product is made just after said product is placed in the vicinity of said zone.

In a fifth embodiment the alternating magnetic field is applied with a first retrievable tool lowered into the wellbore. In a sixth the alternating magnetic field is applied with a second permanent tool embedded in a casing or a tubing lowered into the wellbore.

Preferably, the method further comprises the step of ceasing the step of applying an alternating magnetic field on said product when said initiator was activated and has triggered polymerization chain reaction of said monomer molecules. More preferably, the alternating magnetic field is of frequency between 2 MHz and 30 MHz.

Preferably, the product creates a solid/gel material having a mechanical strength between 20 MPa and 80 MPa. And when the method is used with the product comprising a material suitable to set, said product creates first a solid/gel material having a mechanical strength between 20 MPa and 80 MPa the time that the material suitable to set sets and further develops a mechanical strength between 20 MPa and 80 MPa.

BRIEF DESCRIPTION OF THE DRAWINGS

Further embodiments of the present invention can be understood with the appended drawings.

DETAILED DESCRIPTION

Figure 1:
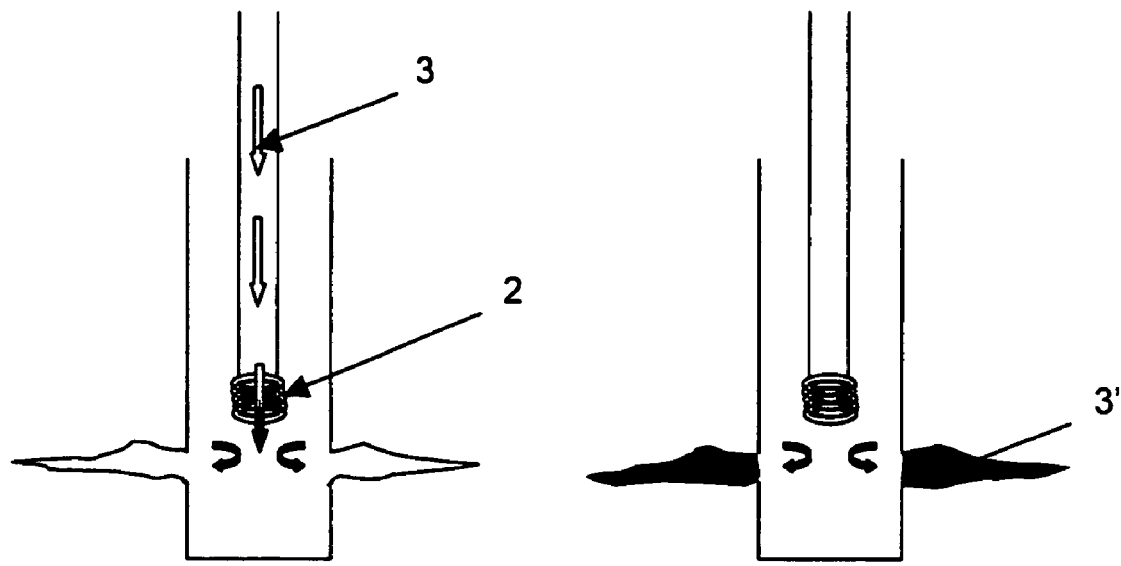
FIG. 1 shows a schematic diagram illustrating the method and the product according to the invention in a first embodiment.

The present invention uses the combination of an induction heating means and susceptors for triggering the property change of chemicals composition as for examples monomers into polymers. So, the invention involves the use of heating agents that heat, under an alternating magnetic field, at an unexpectedly quick rate. More specifically, the invention provides heating agents that heat at average heating rates greater than 300° C./s (575° F./s) to activate initiator that will initiate a polymerization chain reaction such that a solid/gel polymer is created.

The present invention uses a combination of at least two susceptors and high frequency alternating magnetic fields to generate heat, which is used to activate the initiator which starts the chemical process of polymerization.

Both ferromagnetism in a ferromagnetic material and ferrimagnetism in a non-conductive ferromagnetic material disappears at the Curie temperature as thermal oscillations overcome the orientation due to exchange interaction, resulting in a random grouping of the atomic particles. When a non-conductive ferrimagnetic material is placed in an electromagnetic field, the hysteresis losses in the material cause its temperature to rise, eventually reaching its Curie temperature. Upon reaching its Curie temperature, the material crystal lattice undergoes a dimensional change, causing a reversible loss of magnetic dipoles. Once the magnetic dipoles are lost, the ferrimagnetic properties cease, thus halting further heating. Patent application WO03063548 uses a combination of a first non-conductive susceptor and a second electrically conductive susceptor, benefits of this combination seems to be the rapid heating phenomenon. Also, the addition of the second susceptor type helps to focus the magnetic field on the non-conductive susceptors, enabling the temperature to continue to rise rapidly.

As described in the patent application WO03063548, among the important parameters in the process of using two types of susceptors are the following: size and shape of the ferrimagnetic hysteresis loop, susceptor loading, alternate heating mechanisms, particle shape. The term "susceptor" as used herein refers to a material that interacts with a magnetic field to generate a response, e.g., eddy currents and/or hysteretic losses. The methods and apparatus of the present invention are based on the use of dual "susceptors" in oilfield applications that can be used to heat monomers and associated initiator such that a polymerization chain reaction begins and said monomers create a polymer able to form a solid/gel mass. The susceptors are further described below.

The invention relates to a product for activating an initiator, wherein the activation is made by heating the initiator with materials comprising dual susceptors. At this time, the initiator initials a polymerization chain reaction with various monomers, such that a polymer is formed from the association of these monomers. The product of the invention is first in a liquid sate and contains all the materials needed to activate it when a magnetic field is applied. After, the product of the invention becomes a solid/gel polymer when the polymerization chain reaction finishes. The product of the invention is especially useful for oilfield application, wherein a product first in liquid state is needed to be pumped (or at least with a viscosity allowing it to be pumped to the bottom hole of the well) and after to be solidified rapidly so it shows a sufficient mechanical strength for various type of downhole application. So, according to the method of the invention, the product is used to treat a zone of the wellbore.

In the product, the susceptors comprise (a) at least one plurality of electrically non-conductive susceptors and (b) at least one plurality of electrically conductive susceptors. The method and product of the present invention utilize the fact that magnetic induction heating occurs in magnetic or electrically conductive materials when they are subject to an applied alternating magnetic field. The present invention takes advantage of the heating that occurs in the combination of susceptors described herein. When a current-carrying body, or coil, is placed near the susceptors of the present invention, the magnetic field caused by the current in the coil induces a current in the susceptors. In the electrically conductive magnetic susceptors, heating occurs by both eddy current and hysteresis losses. It is eddy currents losses that dominate.

In the non-conducting magnetic materials, heating occurs by hysteresis losses. In this later case, the amount of energy available for heating is proportional to the area of flux vs. field intensity hysteresis curve (B vs. H) and frequency of the alternating field. This mechanism exists as long as the temperature is kept below the Curie point ($T_c$) of the material. At the Curie point, the originally magnetic material becomes non-ferromagnetic. Thus, at its $T_c$ heating of the magnetic material ceases. The combination of these conductive and non-conductive susceptors as described herein produces a rapid rate of heating, e.g., greater than 300° C./s.

The method of the present invention enables the user to achieve quick formation of a solid/gel polymer from a solution of monomers, initiator and susceptors by selecting the appropriate combination of susceptors based upon the desired application. For example, the rate of heating of susceptors, impacting the activation of the initiator is controlled by the ratios of the susceptors.

As said, the dual susceptors comprise electrically non-conductive susceptors and electrically conductive susceptors.

The electrically non-conductive susceptors are preferably micron-sized ferrimagnetic particles. Examples of the electrically non-conductive particles include, but are not limited to, iron oxides, hexagonal ferrites, or magnetically soft ferrites. Examples of hexagonal ferrites include compounds that have the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation. Examples of the magnetically soft ferrite particles have the composition $1Me_bO:1Fe_2O_3$, where $Me_bO$ is a transition metal oxide. $Me_a$ comprises Mg, Co, Mn or Zn and $Me_b$ comprises Ni, Co, Mn, or Zn. In preferred embodiments the electrically non-conductive particles, e.g., ferrimagnetic particles, have a size of from about 1 μm to about 50 μm. The electrically non conductive particles comprises from about $20^{w/o}$ ($10^{v/o}$) to about $58^{w/o}$ ($30^{v/o}$) of the composition. Examples of useful hexagonal ferrites include those shown in Table 1:

TABLE 1

| Me-2W | Me-2Y | Me-2Z |
|---|---|---|
| $Co_2Ba_1Fe_{16}O_{26}$ | $Co_2Ba_2Fe_{12}O_{22}$ | $Co_2Ba_3Fe_{24}O_{41}$ |
| $Co_1Zn_1Ba_1Fe_{16}C_{26}$ | $Co_1Zn_1Ba_2Fe_{12}O_{22}$ | $Co_1Zn_1Ba_3Fe_{24}O_{41}$ |
| $Mg_2Ba_1Fe_{16}O_{26}$ | $Mg_2Ba_2Fe_{12}O_{22}$ | $Mg_2Ba_3Fe_{24}O_{41}$ |
| $Mg_1Zn_1Ba1Fe16O26$ | $Mg_1Zn_1Ba_2Fe_{12}O_{22}$ | $Mg_1Zn_1Ba_3Fe_{24}O_{41}$ |
| $Mn_2Ba_1Fe_{16}O_{26}$ | $Mn_2Ba_2Fe_{12}O_{22}$ | $Mn_2Ba_3Fe_{24}O_{41}$ |
| $Mn_1Zn_1Ba_1Fe_{16}O_{26}$ | $Mn_1Zn_1Ba_2Fe_{12}O_{22}$ | $Mn_1Zn_1Ba_3Fe_{24}O_{41}$ |

See L. L. Hench and J. K. West: "Principles of Electronic Ceramics" (John Wiley & Sons 1990) pp. 321-325. The ferromagnetic hexagonal ferrites are also known as hexagonal ferrimagnetic oxides. Examples of preferred ferrimagnetic hexagonal ferrites include SrF, Co-2Y and Mg-2Y. A range of Curie temperatures is preferred for the susceptors to be effective in activating different types of initiators.

Other non-conducting particles comprise magnetically soft ferrite particles having the structure $1MeO:1Fe_2O_3$, where MeO is a transition metal oxide. Examples of Me include Ni, Co, Mn, and Zn. Preferred particles include: $(Mn, ZnO)Fe_2O_3$ and $(Ni,ZnO)Fe_2O_3$, also referred to as MnZn and NiZn ferrites, respectively. Even though "soft" ferrites have a narrower hysteresis loop than the "hard" ferrites, efficient heating with "soft" ferrites is achievable under proper processing conditions, e.g., power level and frequency, that utilize the total hysteresis loop area.

The electrically conductive susceptors are preferably ferromagnetic particles and intrinsically conductive polymer (ICP) particles. The electrically conductive ferromagnetic particles can be elemental ferromagnetic particles or ferromagnetic alloys. Examples of electrically conductive particles comprise; nickel iron and cobalt and combinations thereof and of their alloys. Preferred; ferromagnetic particles have a size of from about 5 µm to about 100 µm, more preferably from about 10 µm to about 50 µm. Intrinsically conductive polymers (ICPs) are organic polymers that conduct electric currents while retaining the other typical properties commonly associated with a conventional polymer. ICPs are different from so-called conducting polymers that are merely a physical mixture of a non-conducting polymer with a conducting material such as metal or carbon powder. In addition to the generation of heat by hysteresis losses in the ferrimagnetic particles eddy current losses within the electrically conductive polymer contribute additional heating to enhance the rate of heating of the heating agent. Since ICPs tend to lose their electrical conductivity at temperatures above about 200° C. heating agents utilizing ICPs are preferably used in applications in which the maximum process welding temperature is below 200° C. Examples of ICPs include polyaniline, polypyrrole, polythiophene, polyethylenedioxythiophene, and poly (p-phenylene vinylene). The electrically conductive particles preferably have a size of from about 5 µm to about 100 µm, more preferably, from about 10 µm to about 50 µm and comprise from about $10^{w/o}$ ($5^{v/o}$) to about $29^{w/o}$ ($15^{v/o}$) of the composition.

Examples of dual susceptor formulations include Strontium Ferrite/Flake Nickel; Mn—Zn Ferrite/Flake 97Ni-3Al; Mn—Zn Ferrite/Iron.

According to the product of the invention, the dual susceptor is present with an initiator and monomers. The initiator and the monomers are present to permit a polymerization through an addition polymerization (also called polyaddition or chain growth polymerization). The addition polymerization is a polymerization technique where monomer molecules add on to a growing polymer chain one at a time, as shown by the formula nM (monomer)→-(-M-)$_n$-(polymer). The addition polymerization involves three distinct steps: the chain initiation (1), usually by means of the initiator which starts the chemical process. The initiator initiates a chemical chain reaction. Usually, it forms a free radical, i.e. an atom or molecule with at least one unpaired electron, or a group of atoms, charged or uncharged, that act as a single entity in reaction. Typical initiators include any organic compound with a labile group: e.g. azo (—N═N—), disulphide (—S—S—), or peroxide (—O—O—). Examples are benzoyl peroxide, persulfate, and Azobisisobutyronitrile (AIBN). The further steps are the chain propagation (2), wherein the wanted polymer is formed, and the chain termination (3), which occurs either by combination or disproportionation. Termination, in radical polymerization, is when the free radicals combine and is the end of the polymerization process. According to the invention, monomers used are of the type acrylic monomers such as acrylic acid, methyl methacrylate, and acrylamide, more preferably, acrylate-based monomer is suitable.

The product and method of the present invention enable the use of standard coil constructions and the use of available induction generators. The coil current used in the present invention ranges from about 50 to about 150 A. The method of the present invention produces rapid heating rates at lower coil currents. According to the type of susceptors used, the frequency and the strength of the magnetic field are adjusted so it can be used to induce heating for activation of the initiator. Preferably the useful frequency range is from about 2 MHz to about 30 MHz and the preferred power ranges from about 1 kW to about 7.5 kW. Where the desired temperature is higher the frequency and power will be at the higher end of the range, e.g., from about 10 MHz to about 15 MHz.

Depending on the susceptors used, the field generated by the induction coil influences the heating patterns of the susceptors and the field is a function of the coil geometry. Examples of coil design include solenoid, pancake, conical and Helmholtz. While these coil types are among those commonly used by industry, certain embodiments of invention may require specialized coils. For example, in certain embodiments solenoid coils are preferred because solenoid coil geometry produces a very strong magnetic field. In other embodiments, pancake coils are used. Pancake coils have been found to produce a non-uniform field with its maximum at the center. Magnetic field strength increases with increasing number of coil turns, increasing coil current and decreasing coil-work piece separation. The factors can be readily manipulated by one of ordinary skill in the art to select combinations of these factors to obtain the desired magnetic field strength. Solenoid coil geometry produces the strongest field of all the possible geometries. Pancake coils are most common in one-sided heating applications. Changing the coil parameters (e.g., spacing between turns or the number of turns) can change the field values, but the pattern is generally the same.

According to a first embodiment of the method of the invention, as shown on FIG. 1, the product is used in curing loss circulation. FIG. 1 shows a longitudinal section view of the wellbore. The product comprising monomers, initiator and dual susceptor is pumped downhole 3 through conventional pumping techniques. An induction coil 2 is embodied at the end of the tubing/pipe, and is connected to a power source (not shown) on surface. The coil is a solenoid extending longitudinally at the end of the tubing/pipe, so that the magnetic field is along the axis of the tubing/pipe. When triggering is required, the magnetic field is turned on, and the local high heat generated around the susceptor triggers the initiation of polymerization, and subsequently forms a solid/gel material that posses enough mechanical strength to eliminate losing fluid into the loss zone 3'.

Figure 2:
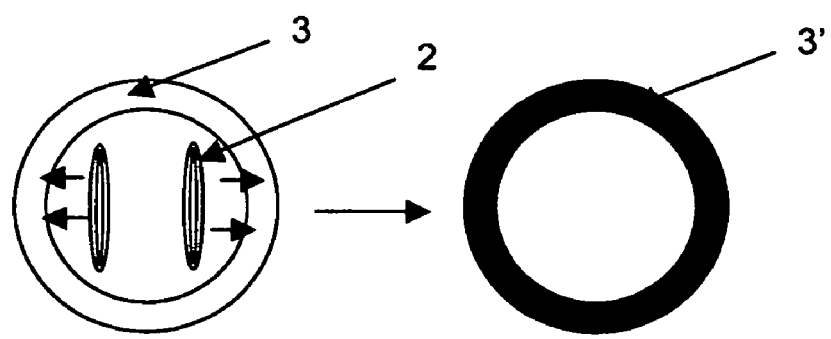
FIG. 2 shows a schematic diagram illustrating the method and the product according to the invention in a second embodiment.

According to a second embodiment of the method of the invention, as shown on FIG. 2, the product is used in consolidation of unconsolidated zone in the wellbore, during drilling for example or in fact at anytime in the life of the well. FIG. 2 shows a cross section view of the wellbore. The product comprising monomers, initiator and dual susceptor can be designed to accumulate in the mud cake during drilling 3, and then activate when needed. An induction coil 2 is embodied at the end, or close to the end of a drilling tool, and is connected to a power source (not shown) on surface. The coil is a solenoid extending radially from the drilling tool, so that the magnetic field is along a radius perpendicular to the axis of the drilling tool. The objective is similar to loss circulation, i.e. create a solid/gel material that posses enough mechanical strength to stop the wellbore from fracturing.

According to the invention, other embodiments can be implemented; also it is possible to use the product of the invention with other conventional techniques. For example, the product comprising monomers, initiator and dual susceptor is used with a material suitable to set as for example a resin, a cement or a geopolymer. In a preferred embodiment, the material suitable to set is a cement, and the product and the cement are pumped in the well. For example, the cement is pumped first in a large unconsolidated zone and the product after, the cement fills the zone to be treated and the product covers with a layer the cement already put in place but still not set. The layer solidifies rapidly thanks to the method of the invention as described below, allowing the cement put in place to remain in a static state for better setting.

The invention claimed is:

1. A product being in liquid state and comprising:
   a first electrically non-conductive susceptor;
   a second electrically conductive susceptor;
   monomer molecules; and
   an initiator, suitable to trigger polymerization chain reaction of said monomer molecules, when activated by said first and/or said second susceptor
wherein the initiator includes any organic compound with a labile group taken in the list constituted of azo (—N=N—), disulphide (—S—S—), and peroxide (—O—O—).

2. The product of claim 1, wherein the initiator includes a persulfate.

3. The product of claim 1, wherein the monomer is acrylate-based monomer.

4. The product of claim 1, wherein the first electrically non-conductive susceptors comprise iron oxide particles, hexagonal ferrite particles, or magnetically soft ferrite particles.

5. The product of claim 1, wherein the second electrically conductive susceptors comprise elemental ferromagnetic particles or ferromagnetic alloys.

6. The product of claim 1, wherein the second electrically conductive susceptors comprise nickel, iron, and cobalt and combinations thereof and of their alloys.

7. The product of claim 1, further comprising a material suitable to set.

8. The product of claim 7, wherein the material is anyone taken in the list constituted of: cement, geopolymer and resin.

9. A method to treat a wellbore including a zone comprising the steps of:
   pumping a product into said wellbore;
   placing said product in the vicinity of said zone; and
   applying an alternating magnetic field on said product
wherein the product is in liquid state and comprises:
   a first electrically non-conductive susceptor;
   a second electrically conductive susceptor;
   monomer molecules; and
   an initiator, suitable to trigger polymerization chain reaction of said monomer molecules, when activated by said first and/or said second susceptor.

10. The method of claim 9, applying to consolidate the wellbore, wherein said zone is an unconsolidated zone.

11. The method of claim 9, applying to eliminate losing fluid in the wellbore, wherein said zone is a loss zone.

12. The method of claim 9, wherein the step of applying an alternating magnetic field on said product is made just before said product is placed in the vicinity of said zone.

13. The method of claim 9, wherein the step of applying an alternating magnetic field on said product is made just after said product is placed in the vicinity of said zone.

14. The method of claim 9, wherein the alternating magnetic field is applied with a first retrievable tool lowered into the wellbore.

15. The method of claim 14, wherein the alternating magnetic field is applied with a second permanent tool embedded in a casing or a tubing lowered into the wellbore.

16. The method of claim 9, further comprising the step of ceasing the step of applying an alternating magnetic field on said product when said initiator was activated and has triggered polymerization chain reaction of said monomer molecules.

17. The method of claim 9, wherein the alternating magnetic field is of frequency between 2 MHz and 30 MHz.

18. The method of claim 9, wherein said product creates a solid/gel material having a mechanical strength between 20 MPa and 80 MPa.

19. The method of claim 9, wherein said product further comprises a material suitable to set and creates first a solid/gel material having a mechanical strength between 20 MPa and 80 MPa the time that the material suitable to set sets and further develops a mechanical strength between 20 MPa and 80 MPa.

* * * * *